Oct. 15, 1946.　　　A. H. AHRNDT　　　2,409,463
FOOD TENDERING MACHINE
Filed Aug. 21, 1942　　　9 Sheets-Sheet 1
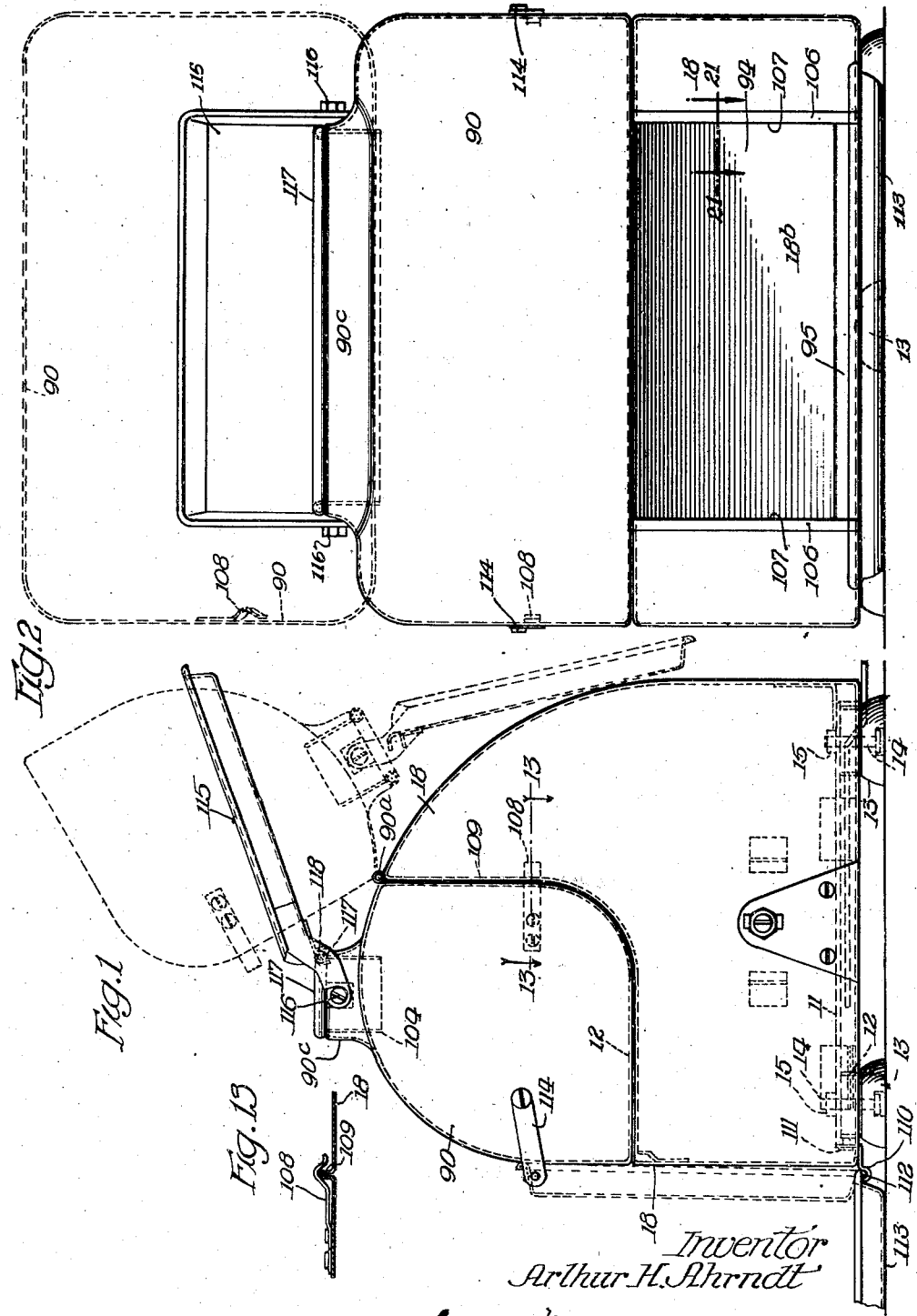
Inventor
Arthur H. Ahrndt
By Spencer, Marzall, Johnston & Cook,
Attys

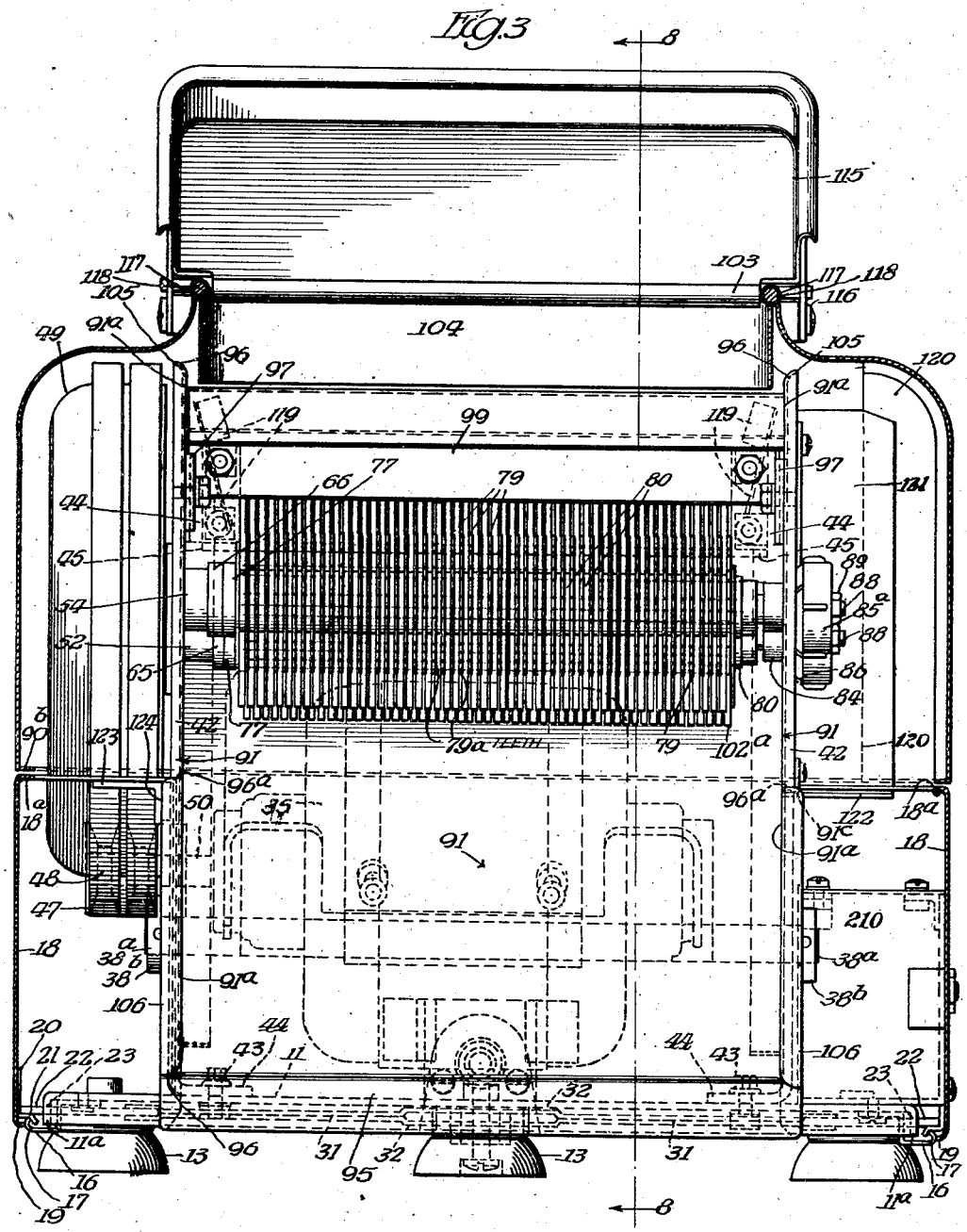

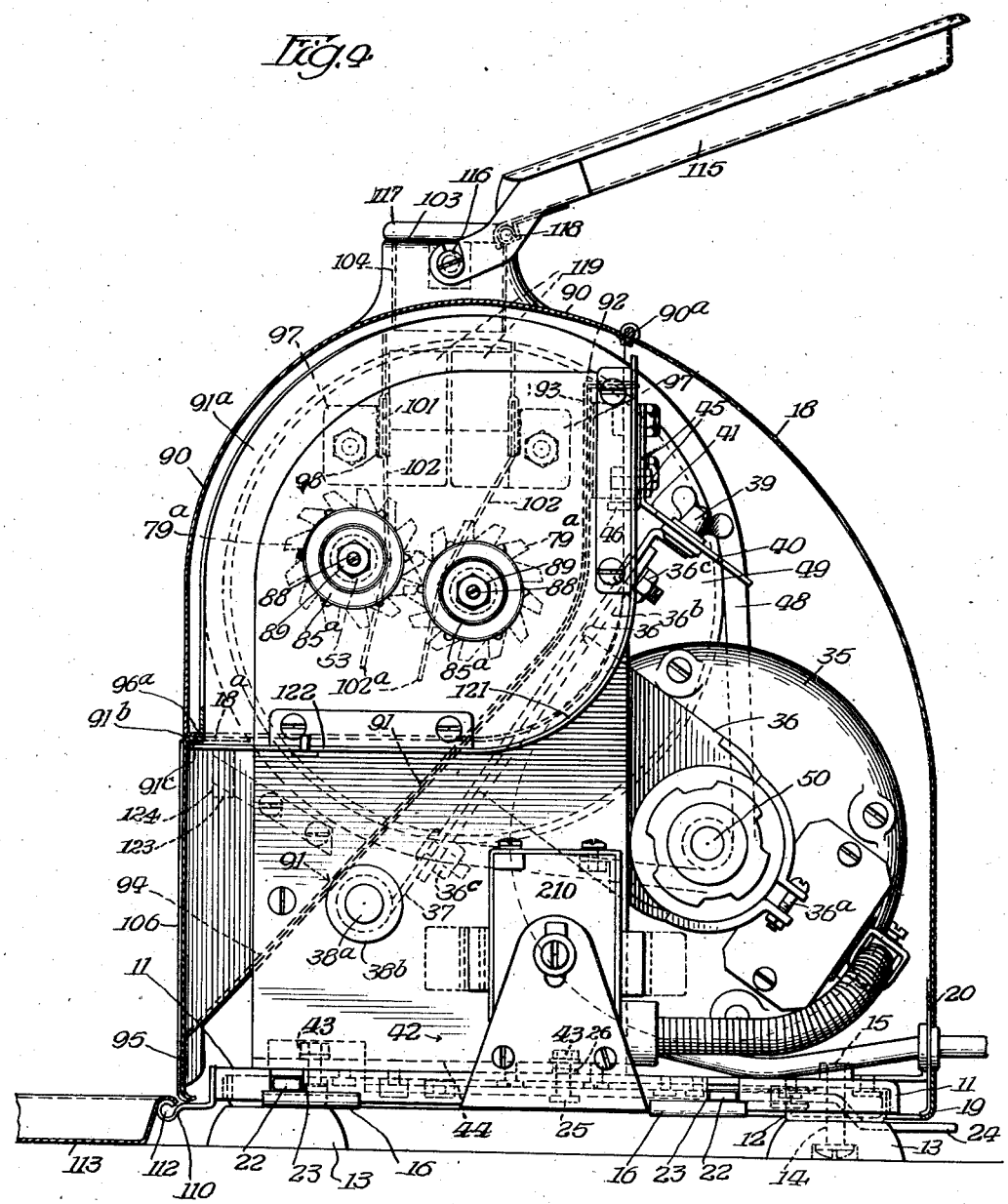

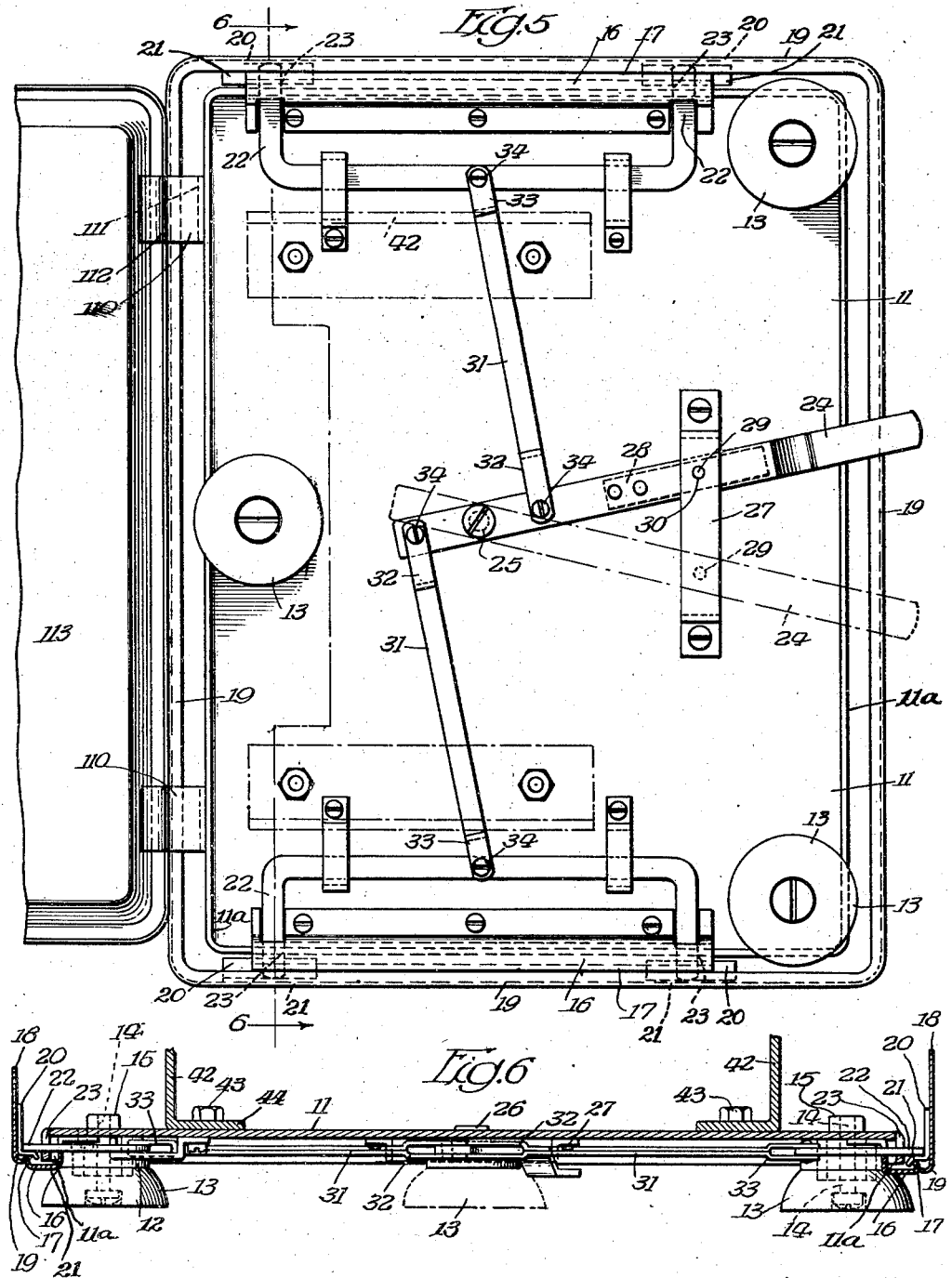

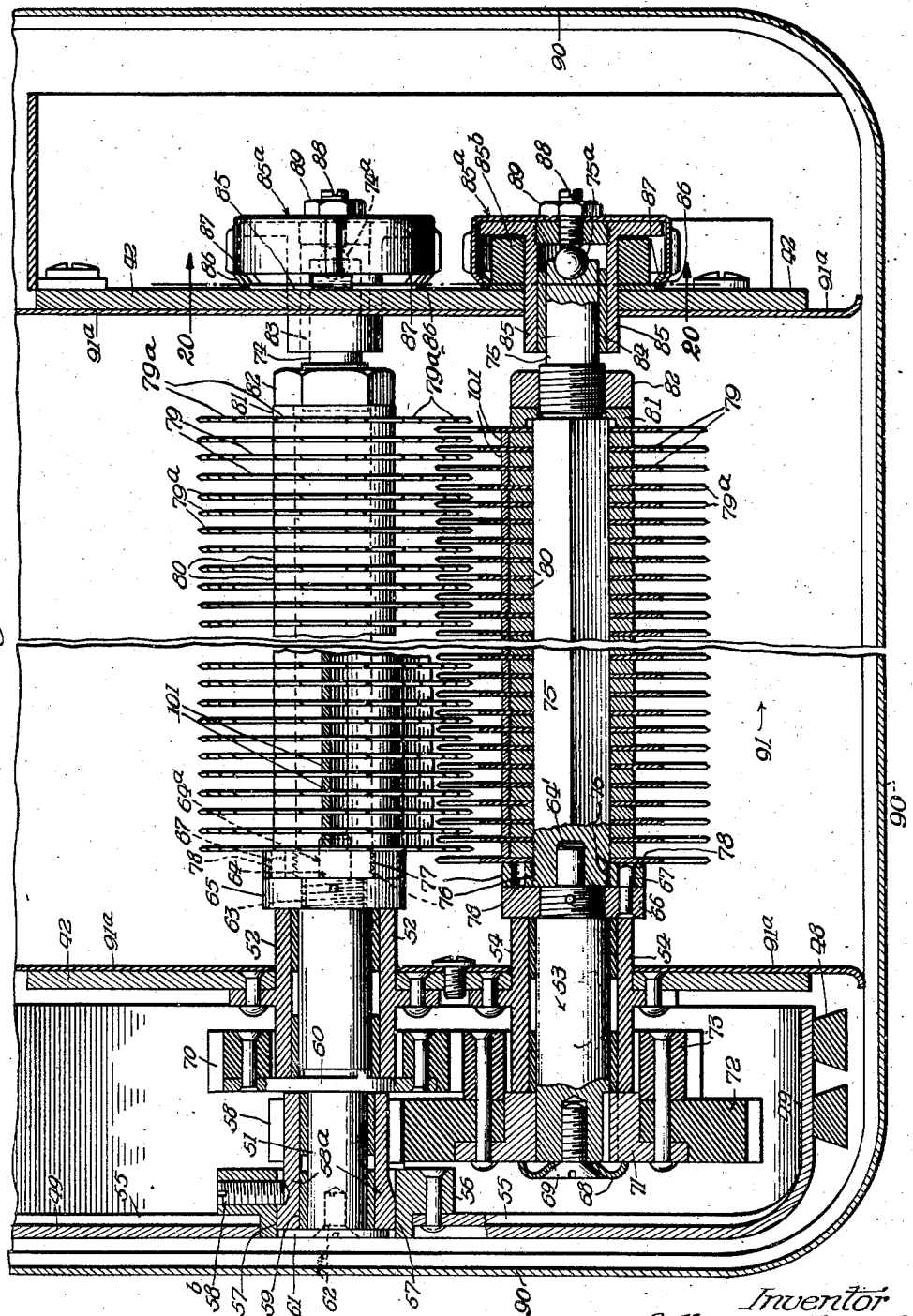

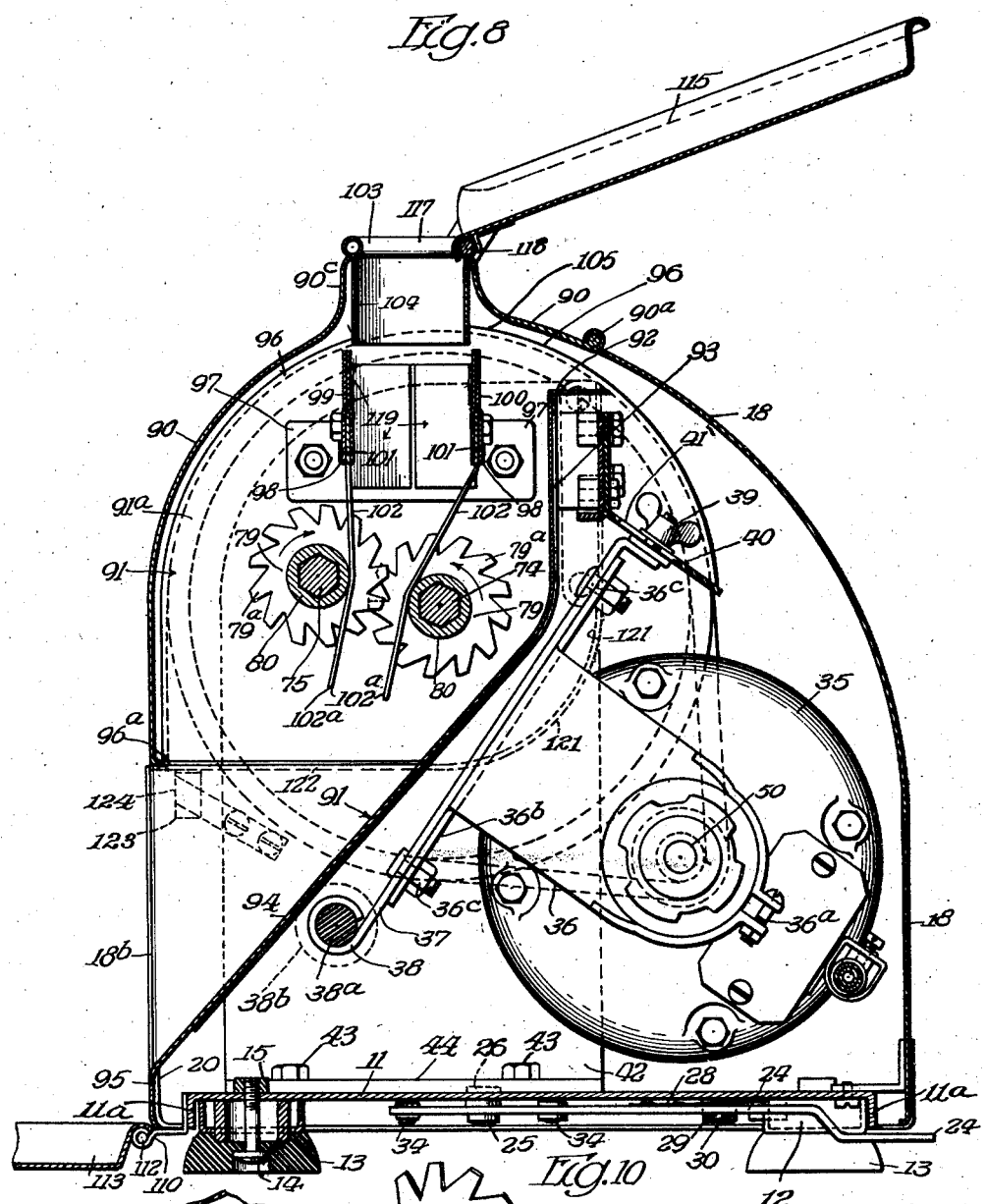
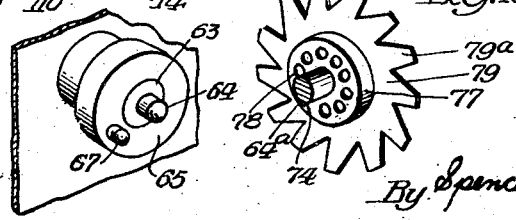

Oct. 15, 1946.  A. H. AHRNDT  2,409,463
FOOD TENDERING MACHINE
Filed Aug. 21, 1942   9 Sheets-Sheet 7

Inventor
Arthur H. Ahrndt
By Spencer, Marzall, Johnston & Cook
Attys

Oct. 15, 1946.  A. H. AHRNDT  2,409,463
FOOD TENDERING MACHINE
Filed Aug. 21, 1942          9 Sheets-Sheet 8
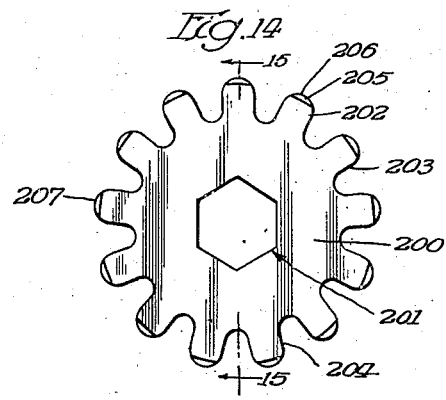
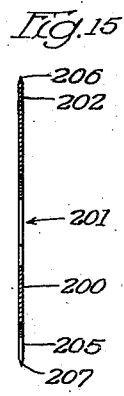
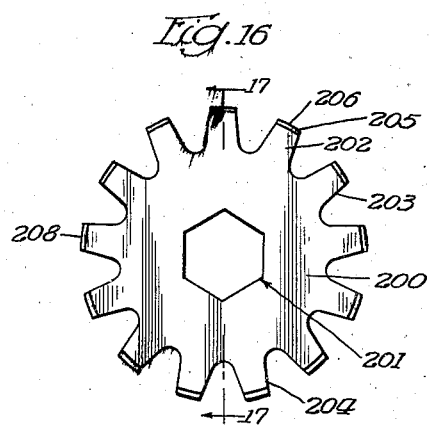
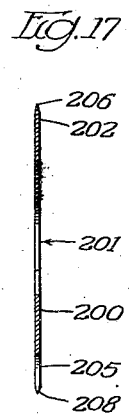
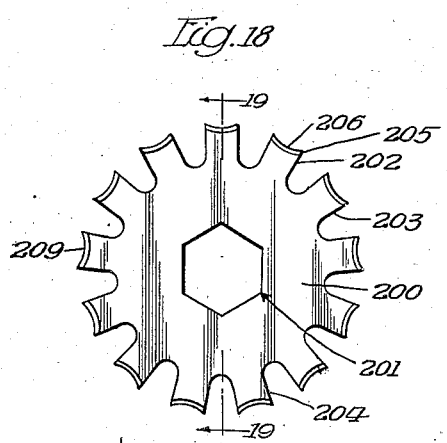
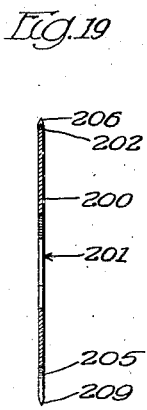
Inventor
Arthur H. Ahrndt
By Spencer, Marzall, Johnston + Cook
Attys Oct. 15, 1946.  A. H. AHRNDT  2,409,463
FOOD TENDERING MACHINE
Filed Aug. 21, 1942  9 Sheets-Sheet 9
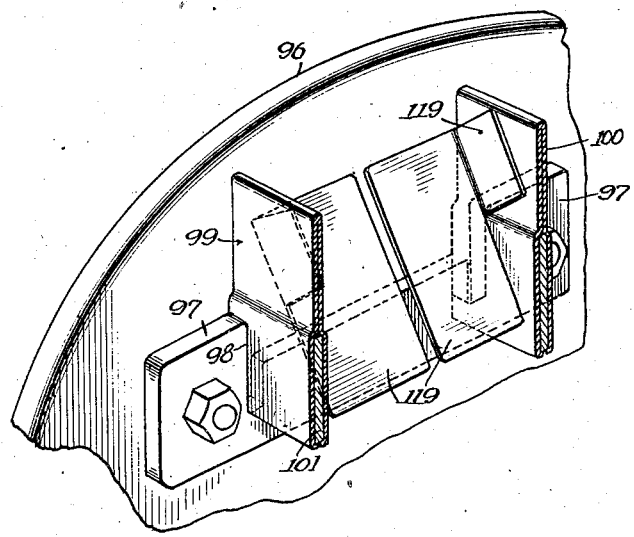
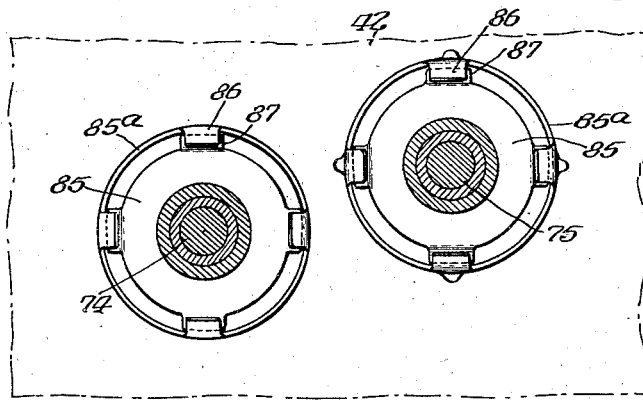
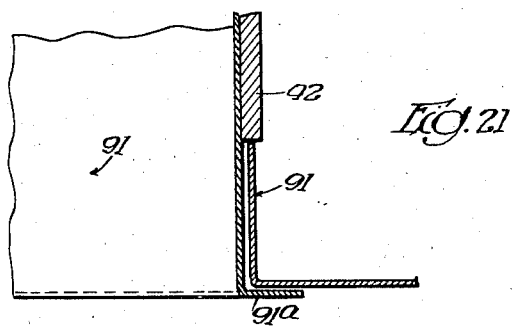
Inventor
Arthur H. Ahrndt
By Spencer, Marzall, Johnston & Cook
Attys.

UNITED STATES PATENT OFFICE 2,409,463

FOOD TENDERING MACHINE

Arthur H. Ahrndt, La Porte, Ind., assignor to U. S. Slicing Machine Company, La Porte, Ind., a corporation of Indiana Application August 21, 1942, Serial No. 455,561

11 Claims. (Cl. 17—26)

This invention relates in general to a food tendering machine and more particularly to a machine for tenderizing meat, and other articles of food, to render the same more edible and appetizing.

An object of this invention is to provide compact, safe, simple and efficient means for receiving, and quickly and hygienically tendering and dispensing meat and other articles of food, particularly in the presence, and subject to the inspection of customers.

Other objects of this invention include the provision of novel means for housing or covering such a machine and for supporting, locking and securing such a housing in position; the provision of novel means for keeping such a machine free from obstructions and accumulations of food, and particularly the provision of novel cutting means and means for mounting, demounting, and securing said cutting means in position; also a novel mechanism for driving said cutting means. Additional objects, advantages and capabilities inherent in this invention will become readily apparent from the description thereof which follows.

Another object of the invention is the provision of knife blades having particular and precise cutting or tendering edges, the blades being arranged about an axis to provide an improved knife or tendering instrument.

This invention further resides in the combination, construction and arrangement of parts illustrated in the accompanying drawings, and while there is shown therein preferred embodiments of the invention, it is to be understood that the same are susceptible of modification and change without departing from the spirit of the invention.

The accompanying drawings illustrate a selected embodiment of the invention, and the views therein are as follows:

Fig. 1 is a side elevation of the invention with the housing or cover in locked position, the open position of the housing lid being indicated in dotted lines;

Fig. 2 is a frontal view of the machine with the housing in place; dotted lines indicate an elevated position of the lid;

Fig. 3 is a front elevation of the machine with the lid removed, the housing being shown partially in section;

Fig. 4 is a side elevation of the machine with the housing shown partially in section;

Fig. 5 is a plan view of the housing lock assembly;

Fig. 6 is a vertical sectional view along the line 6—6 of Fig. 5;

Fig. 7 is a fragmentary plan view, partially in section, of the cutting means and mechanism for driving the same;

Fig. 8 is a vertical sectional view of the machine along the line 8—8 of Fig. 3;

Fig. 9 is a fragmentary perspective view of one end of the knife-driving shaft, with collar attached, showing pins for connecting with the knife shaft;

Fig. 10 is a fragmentary perspective view of one end of a knife or cutter shaft with the knife mounted thereon and collar attached, showing holes for receiving pins for the driving connection;

Fig. 13 is a fragmentary sectional view along the line 13—13 of Fig. 1;

Fig. 14 is a detail plan or elevational view of one form of blade which may be used on the machine;

Fig. 15 is a detail sectional view on the line 15—15 of Fig. 14;

Fig. 16 is a detail plan or elevational view of another form of blade;

Fig. 17 is a detail sectional view on the line 17—17 of Fig. 16;

Fig. 18 is a detail plan or elevational view of still another form of blade;

Fig. 19 is a detail sectional view on the line 19—19 of Fig. 18;

Fig. 20 is a sectional view along the line 20—20 in Fig. 7.

Fig. 21 is a detail sectional view along the line 21—21 of Fig. 2.

Fig. 22 is a perspective view of the brackets 97 and plates 119 appearing in Fig. 12.

Figure 11:
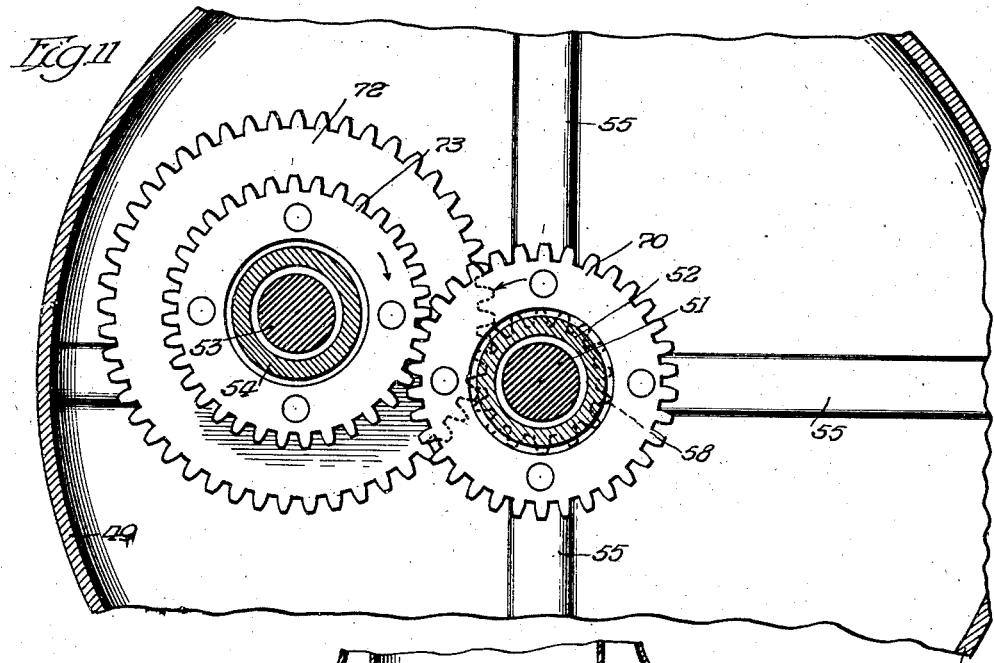
Fig. 11 is a fragmentary side view, partially in section, of gearing for the driving knife or cutter shafts.

The particular machine herein disclosed for the purpose of illustrating the invention comprises a base 11 which, as shown, is of steel and relatively rectangular in shape but with rounded corners. The base 11, which may be of any other suitable or desirable material and shape, is provided with a downwardly extending peripheral flange 11a. Suitably spaced cup-shaped spacers 12 (Fig. 8) are secured to the base, and these spacers rest on rubber feet 13, which are secured to the under side by means of bolts 14 and nuts 15. Z-bars 16 (Figs. 5 and 6), each having an outer angular flange portion or upturned extremity or leg 17, are welded or otherwise secured to the under side of the base 11.

A housing or cover 18 is constructed so as to enclose the mechanism of the machine, and this housing 18 is adapted to be secured to the base 11. The bottom edge of the cover or housing 18 is turned inwardly at 19, and arranged to butt against the upturned legs 17 of the bars 16 in order to stiffen the structure and to provide a close fit.

Angular brackets 20, having an inwardly extending angular flange 21, adapted to seat on the upturned leg 17, are welded or otherwise secured to the inside bottom portions of opposite sides of the cover or housing 18, and these brackets are so arranged that when the cover 18 is in place, the cover can be displaced upwardly only. Spaced U-shaped locking bars 22 disposed beneath the base 11 on each side of the machine are adapted to pass through similarly spaced holes 23 in flange 11a of the base and extend across the top of the flange 21 on each side of the cover, so as to prevent the lifting of the cover.

The locking bars 22 are operatively connected with a lock operating lever 24, which is pivoted on a screw 25, the screw 25 being fastened to the base 11 as indicated at 26 (Fig. 6). A stirrup frame 27 which is also fastened to the base 11 serves as a guide for lever 24. The upper side of lever 24 carries a spring 28 and the lower side of the lever is provided with a pin 29 registrable in one extreme position with a hole 30 in the frame 27. The arrangement is such that the spring 28 will engage the stirrup 27 normally to press pin 29 into register with hole 30. Connecting bars 31, having forked ends 32, 33, and connecting pins 34, connect the locking bars 22 to the operating lever 24. The locking bars 22 retract to permit removal of cover 18, the lever 24 being lifted against the pressure of the spring 28 to disengage the pin 29 from the hole 30 and permit the shifting of the lever 24 and the bars 22.

A motor 35 (Figs. 4, 8), connected with a suitable source of power and controlled by an electric switch, is clamped within a bracket 36 as indicated at 36a. The bracket 36 comprises a base portion 36b which is bolted at 36c to the bracket arm 37. One end 38 of the bracket arm 37 is pivotally mounted on a horizontally extending rod 38a, and the opposite end of the bracket arm is adjustably secured by means of thumb screws 39. The thumb screws engage longitudinally extending slots 40 in the outer portion of brackets 41, which are resilient to allow for arcuate movement of the bracket arm 37. The ends of the rod 38a are mounted respectively in upwardly extending spaced brackets 42, the lower ends of which are provided with inwardly extending angular flanges and secured to the base 11 at 43. The rod 38a is held in position by means of collars 38b. The brackets 41 are supported at one end by brackets 42 through angle bars 44 connected therewith by cross bars 45 which are stiffened by angular flanges or legs 46.

A knife-driving shaft 51 is operatively connected with the motor 35 through a V-grooved pulley 47, belt 48, pulley 49 and motor drive shaft 50. The shaft 51 is journaled in a bearing 52 (Fig. 7) which is horizontally disposed in the upper portion of the left-hand bracket 42. A second knife-driving shaft 53, having its axis parallel to the axis of the shaft 51, is journaled in a bearing 54 also horizontally disposed at the upper portion of the left-hand bracket 42, but spaced forwardly from and somewhat above the bearing 52. The pulley 49 is loosely and rotatably mounted upon the outer left-hand portion of the shaft 51 and is reinforced by radial ribs 55, the shaft 51 being mounted in a hub 56 which is bored at 57 to receive a pinion 58. The pinion 58 comprises a hub portion 58a which is received within the bore 57 of the hub 56 and also rotatably mounted upon the shaft 51. A set screw 58b is provided for securing the pinion 58 to the pulley 49 for rotation therewith.

A collar 60 is fixedly mounted on the shaft 51 or made integral therewith, and this collar is disposed intermediate the pinion 58 and the left end of the bearing 52. Outward sliding movement of the pulley 49 and the pinion 58 is restricted by a washer 61 which is secured to the left end of the shaft 51 by a screw 62, the screw 62 being threaded in the shaft 51. Inner sliding movement is restricted by the collar 60, which is adapted to abut and bear against the outer end of the bearing 52. The outer surface of the shaft 51, near its right end at 63, is threaded and an axially extending pin 64 is seated in or secured to this shaft at its inner end (Figs. 7 and 9). A collar 65 is screwed upon the threaded portion of the shaft 51 and is so positioned as to abut and bear against the inner end of the bearing 52, and thus operate with the collar 60 to maintain the shaft 51 against sliding movement in the bearing 52.

The inner, right end of the shaft 53 is provided with a collar 66 and an axially extending pin 64′ corresponding to the pin 64. The collars 65 and 66 are each provided with a driving pin 67 which is spaced radially from and extends in a direction parallel with that of the pins 64 and 64′. A washer 68 is secured to the left end of the shaft 53 by a screw 69 which is screwed into the internally threaded left end of this shaft. A pinion 70 is fixedly mounted on the collar 66 and this pinion is adapted to rotate with the collar 66. A hub 71 is splined to the shaft 53 and this hub has fixedly mounted thereon a large gear 72 and a small gear 73, both of which are held against sliding movement by the washer 68. The washer also serves, with the collar 66 and the hub 71, to guide the shaft 53 in the bearing 54. The pinions 58 and 70, and the gears 72 and 73 are respectively so positioned that the gear 72 meshes with the pinion 58 and the gear 73 meshes with the pinion 70.

The driving mechanism is through the motor drive shaft 50 and the belts 48 to the pulley 49. The pulley, together with the pinion 58 attached thereto, revolves freely on the shaft 51. The pinion 58 meshing with the gear 72 drives the shaft 53 and the gear 73, the ratio of the pinion 58 and the gear 72 determining the speed of the shaft 53 and the gear 73. The gear 73 drives the pinion 70 and the shaft 51, the speed of which further depends on the ratio of the gear 73 and the pinion 70. These ratios may be varied to suit various operating conditions. Usually it is preferable to have one of these shafts rotate more slowly than the other. The shafts 51 and 53 will obviously rotate in opposite directions. The direction of rotation of the pulleys 47 and 49 and the arrangement of parts is such that the shafts 51 and 53 will not only rotate in opposite directions but in a direction toward each other downwardly, as indicated by arrows in Fig 11.

Knife shafts 74 and 75, having hexagonal knife receiving portions, are operatively connected with the shafts 51 and 53 respectively through the collars 65 and 66, the pins 64 and 64', and the driving pins 67. These hexagonal knife shafts 74 and 75 have parallel axes and are each provided with a centrally disposed, axially extending hole 64a (Figs. 7 and 10) adapted to receive the pins 64 and 64'. The left end of each shaft 74 and 75 is externally threaded at 76 to receive internally threaded collars 77, which are provided with a plurality of circumferentially disposed, spaced holes 78 adapted to receive the driving pin 67, a plurality of holes being provided to facilitate mounting of the shafts in operating position.

A plurality of generally circular knives 79, having tendering teeth or cutting edges 79a and a plurality of spacing collars 80, are alternately assembled and mounted on the shafts 74 and 75 for rotation therewith. The knives 79 are so arranged that when the shafts 74 and 75 are in operating position, each knife 79 of one shaft, except in an end position, will be disposed opposite a spacing collar 80, and extend between and in a plane intermediate and substantially parallel to the respective planes of two adjacent knives on the other shaft. The assembled knives 79 and collars 80 are tightly secured together against the collar 77 by a washer 81, mounted on the shaft near its right end and a nut 82 threaded thereon.

The shafts 74 and 75 have their right ends journaled in bearings 83 and 84, which are attached to sleeves 85. The sleeves are mounted in openings provided in the right-hand bracket 42, each sleeve having an integral knob 85a provided with a lug 86 so as to lock, upon turning the knob, with a cooperating lug 87 secured to the bracket 42. The bearings 83 and 84 are in axial alignment with the bearings 52 and 54, respectively, and are thus readily demountable by merely turning the knobs 85a to disengage the lugs 86 and 87 and withdrawing the bearings. A thrust collar 85b is provided about each of said sleeves 85 and is adapted to be received within the knob 85a.

An adjustable thrust bearing is provided for each of the shafts 74 and 75. These thrust bearings comprise balls 74a and 75a, respectively, which are arranged to engage the ends of the shafts 74 and 75 and to bear against adjusting screws 88 provided in knobs 85a, the screws 88 being locked in position by nuts 89. The knife shafts 74, 75, with knives and collars in position thereon, are readily removable when at rest, by turning the knobs 85a to release the lugs 86 from the lugs 87, and then withdrawing the bearings 83 and 84 from their respective seats in the bracket 42. The two knife shaft assemblies may then be moved to the right until withdrawn from the pins 64 and 64' and the driving pins 67, after which time they may be lifted from the machine.

The cover or housing 18 has a lid portion 90 which is hinged at its upper rear edge 90a. The front of the lid extends generally downwardly from this hinge approximately in an arc of 90° having its center in the axis of shaft 51, the arrangement being such that the knife shafts 74 and 75 may be readily exposed and removed, for cleaning or other purposes, without removing the entire cover.

The interior of the machine is partially sheathed with preferably smooth corrosion-resisting material 91 (Fig. 3) to avoid accumulation of food particles. The sides 91a of this sheath 91 are substantially vertical and are secured to the inner sides of brackets 42 to provide a lining. The rear wall is provided with an angularly flanged, rearwardly extending top portion 92, a vertical portion 93, an angular, forwardly extending chute or inclined portion 94, and a downwardly extending bottom portion 95 (Figs. 4 and 8). The rear wall of the sheathing is suitably spaced rearwardly from the ends of the blades 79a on the shaft 74. The lower chute or inclined portion 94 is disposed at an angle, thereby affording ready discharge of the material which has been subjected to the tendering operation.

The sides 91a of the sheathing 91 are curved outwardly, as indicated at 96 (Fig. 3), the front edges being broken at 96a (Figs. 3 and 4) to receive the flange 18a of the cover 18. The edges of the sheathing below the break have flanged portions 106 extending forwardly (as at 91b, Fig. 4) and laterally (as at 91c, Fig. 3) a short distance, to serve as guides for the lower front wall of the cover 18. The cover has a cut-away portion 18b to permit the discharge of tenderized food. The edges of the cover 18 and the lid 90 are each stiffened by an inwardly extending angular flange portion 18a and 90b (Fig. 3). The sheath may be of one or several pieces of material.

Transversely extending, horizontally disposed supporting plates or brackets 97 are mounted inside of the sheathing 91 and are secured to the brackets 42. These members 97 are provided with slots 98 adapted to receive the ends 101 of a pair of combs or guide-plates 99 and 100. The combs 99 and 100 (see Figs. 3, 4, 8, 12) have downwardly extending, angular tines or teeth 102, which are somewhat resilient and adapted to fit, in opposed relation and intermediate the shafts 74 and 75, between the knives 79 on the shafts 74 and 75. These combs bear upon the collars 80, their ends 102a extending beyond the edges of the blades 79a. As the shafts 74 and 75, and the knives mounted thereon, revolve, the tines or teeth 102 serve to comb therefrom such food particles as tend to adhere to the knives and collars. The combs 99 and 100 and the tines 102 thereof are formed, arranged, and disposed so that food fed between the combs will fall, or be guided, in approximately equal proportions on the knives of each knife shaft, and a heavy or large piece of food will be acted upon substantially to the same extent by the knives of the shaft 74 as by those of the shaft 75. This is especially advantageous when meat or other food is fed into the machine in thin layers.

The lid 90 is provided with an opening 103 in its upper portion disposed approximately over the space between the combs 99 and 100, and may have an intermediate throat portion 99c. The opening 103 also may have a downwardly extending extension guide or chute 104 of such conformation as to conduct food fed into the opening 103 to the space betwen the guide-plates or combs 99 and 100.

The size of the opening 103, and the size and length of the chute 104, are such that a person cannot easily reach the blades 79a of the knives by sticking a hand through the opening, and there is substantially no danger of the knives engaging the fingers of the operator when material is fed into the machine. The top 105 of the sheathing 91 extends upwardly approximately to meet the inside top portion of the cover 18. Flanges 106 are arranged and adapted to receive and guide the edges 107 (Fig. 2) of the cut-away portions 18b of the cover 18.

The conformation of the cover 18, the lid 90, the sides and rear wall of the sheathing 91 is such as practically to separate the driving mechanism from the food cutting or knife shaft assembly, thus contributing to hygienic operation of the machine. Spring clips 108 (Figs. 1, 13), one mounted on each inner side of the lid 90, are adapted to engage the flanged portion of the cover 18, at 109, to secure or lock the lid in closed position.

A tray-supporting bracket 110 is secured at 111 to the base 11, and this bracket is hingedly connected at 112 with a tray or other suitable receptacle 113 adapted to receive the tenderized meat or other food discharged from the chute 94. When the machine is out of use the tray 113 may be pivoted upwardly to close the opening 18b in the front of the cover 18, and held in that position by a locking strap 114 secured to one side of lid 90.

A feeding tray 115, or other suitable member for the food to be fed to the machine, may be detachably hinged to the lid 90 as at 116. A bead 117 may be provided at the opening 103 to support the tray. The tray may be kept in position by guides 118 supported on the ends of the hinge 116. The housing is provided with an upwardly extending elongated neck. The neck may extend upwardly a sufficient distance to prevent the operator's hands from getting into the knife rolls. A chute member 104, which may be either permanently fastened into the throat or removably mounted therein, is provided. It makes no difference in the machine whether or not the chute 104 is fastened or removable. The bead 117 extends around the opening. If the chute 104 is provided either removably or fixedly, the bead 117 is arranged on the upper end of the chute member 104. If, however, it is decided not to use the chute member 104, then the bead 117 may be provided on the upper end of the casing surrounding the throat 90c.

The combs 99 and 100 are provided with angular end plates or deflectors 119 to direct food fed to the machine to the knives 79 and to prevent the food from passing through the machine without being acted upon properly by the knives.

The cover 18 is extended at one side beyond the bracket 42 to accommodate an electric switch 210 (Fig. 3) of conventional type for controlling the motor 35 as shown in Figs. 3 and 4. A curved, inwardly extending flange 120 is secured to the upper edge of cover 18 to close the intermediate space. This flange is adapted to overlap and seat upon a similarly curved, outwardly extending flange 121 which is secured to the outer side of bracket 42. The two flanges are of such conformation as to close the gap that would otherwise result from such extension of the cover 18 when the lid 90 is in open position. The forward edge 122 of flange 121 also serves with the flange 91c to guide the front edge 18a of the cover 18 and to secure it in position. Similarly, an outwardly extending plate or bracket 123 is provided to guide the other front edge 18a of the cover 18 and prevent the admission and accumulation of waste or dirt within the cover at the other end of the machine. The bracket 123 is secured to the outer side of the bracket 42 at 124 (Fig. 3) to abut and receive the corresponding edge 18a of the cover 18.

Figure 12:
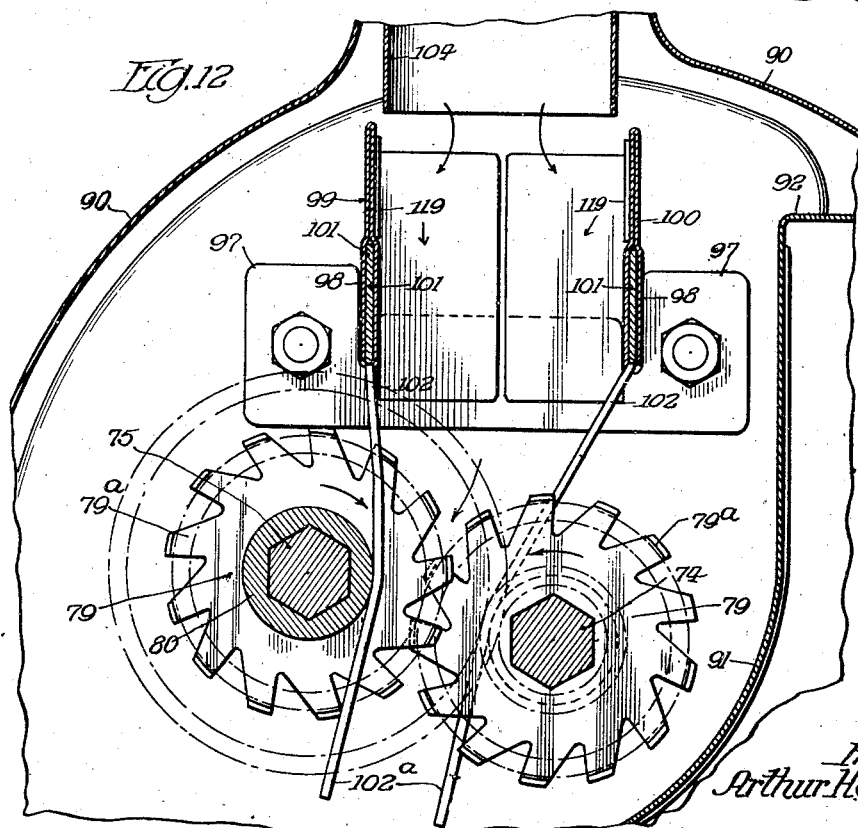
Fig. 12 is a fragmentary side view showing the arrangement of knives and means for preventing accumulation of food thereon, partially in section.

The operation of the machine is such that the shafts 51 and 53, being driven in the manner previously described, will cause the knife shafts 74 and 75 to rotate in opposite directions, as indicated in Fig. 12. Pieces of meat or other material fed into the machine through the opening 103 will pass downwardly through the chute 104 into the space defined by the combs 99 and 100 and the deflectors, and be engaged by the rotating knives 79 to cut the sinews of the meat, or other material. The knives feed the material downwardly between the shafts 74 and 75 and deposit it on the chute 94, whence it is discharged through the opening 18b in the cover 18 into the receptacle 113. The tines 102 of the combs 99 and 100 operate not only to guide and distribute the material upon the knives and to prevent its passing through spaces between the knives without being cut, but also to guide the cut material to the chute 94 as well as to remove, by their combing action, from the knives and collars 89, matter tending to adhere thereto.

In the operation described the knives 79 simply cut or tear the sinews of the meat or other material fed to them. This action may be augmented by having one of the knife shafts rotate more rapidly than another. In such case a pulling or tearing action, as well as a cutting action, will be exerted, due to the speed differential. This may be accomplished by varying the gear ratios, as previously indicated.

The knives 79, which are of the conventional design, may be replaced by the knives shown in Figs. 14 to 19. The knives shown in Figs. 14 to 19 comprise a central body section or disc 200 having a central opening 201 to receive the shafts upon which the knives are mounted in spaced relation. Cutting tines 202 (of which 13 are shown) extend radially from the body and have relatively straight sides 203 and 204 connecting with outer surfaces or edges 205. The extreme ends or tips of the edges 205 are provided with sharpened ground surfaces 206 as indicated in the various figures. Figs. 14 and 15 show the outer surfaces or edges as being curved or arcuate, as indicated at 207. The end or surface 207 of each tine is on a radius substantially equal to one-half the width of a tine between the sides 203 and 204 which are parallel. Figs. 16 and 17 show the sides 203 and 204 converging, the converging sides being connected by a peripheral arc 208. Figs. 18 and 19 show straight parallel sides connected by an inverted arc 209.

The knives shown in Figs. 14 to 19 have been operated successfully during actual tests wherein it was found that the sinews of the meat were actually cut and there was no mutilation of the meat. Also the juices of the meat were retained because there was no mashing or squeezing of the meat. The meat so treated was found to tender very palatably, and to retain all the necessary and requisite flavor.

Changes may be made in the form, construction and arrangement of the parts without departing from the spirit of the invention, and the right is hereby reserved to make all such changes as fairly fall within the scope of the following claims.

The invention is hereby claimed as follows:

1. A machine of the character described comprising a base, a housing adapted to be secured to said base, said housing having a material inlet and a material outlet in communication with each other, locking means for securing said housing to said base, a support mounted on said base, cutting means rotatably mounted in said support, driving means operatively connected with said cutting means, guide means detachably mounted on said support in communication with said inlet and adapted to direct material introduced through said inlet to said cutting means and substantially prevent said material from by-passing said cutting means, said cutting means comprising a plurality of knife shafts, each of said shafts having fixedly mounted thereon a plurality of spaced, radially extending knives, said shafts being so positioned with respect to each other and the knives of one shaft so spaced and arranged with respect to those of another, that the path of rotation of the knives of each shaft will be substantially parallel to and overlap the path of rotation of the knives of another shaft, and each knife of one shaft, except in the case of knives in an end position, will rotate in a space intermediate two adjacent knives of another shaft, said driving means being adapted to drive one knife shaft in a direction opposite to that of another, and means for discharging from said machine material cut therein.

2. In a machine of the character described having a base, a housing adapted to be secured to said base, said housing having a material inlet and a material outlet in communication with each other, a support mounted on said base, cutting means rotatably mounted in said support, driving means operatively connected with said cutting means, and guide means detachably mounted on said support comprising a plurality of combs in opposed relation, each of said combs having a longitudinal body portion provided with a laterally extending, angular wing and a plurality of downwardly extending, spaced, angular projections, said combs being of such conformation and so arranged as to form a conduit in communication with said inlet and said outlet and adapted to direct material fed into said machine through said inlet to said cutting means and thence to said outlet.

3. In a machine of the class described having a base and a pair of spaced, vertically extending, transverse supports mounted on said base, a shaped interior sheath for said machine secured to said supports and extending therebetween, said sheath having a side wall adjoining the inner side of each of said supports and a rear wall integrally connected with each said side wall, said rear wall having a vertically extending portion and a forwardly extending declining portion therebelow acting as a food chute, and a housing removable on the base and having an inlet neck arranged for co-operation with the chute.

4. In a machine of the class described having a base and a pair of spaced, vertically extending, transverse supports mounted on said base, a shaped interior sheath for said machine secured to said supports and extending therebetween, said sheath having a side wall adjoining the inner side of each of said supports and a rear wall integrally connected with each said side wall, said rear wall having a vertically extending portion and a forwardly extending, curved portion therebelow acting as a food chute, and a housing removable on the base and having an inlet neck arranged for co-operation with the chute.

5. In a machine of the character described having a base, a support, motive means mounted on said support, and cutting means rotatably mounted on said support and operatively connected with said motive means, a sheath mounted on said support in spaced relation with said cutting means and said motive means, said sheath acting as a food trough and being adapted to partition said cutting means from said motive means and the operative connection therebetween, a housing over said support and motive means, and an inlet neck on the housing in co-operation with the trough.

6. In a machine of the character described having a base, a housing adapted to be secured to said base, said housing having a material inlet and a material outlet in communication with each other, a support mounted on said base, cutting means rotatably mounted in said support, and guide means detachably mounted on said support, for directing material to be cut in said machine to said cutting means, comprising a longitudinally extending body provided with a laterally projecting wing and a plurality of downwardly projecting, spaced, angular members adapted to cooperate with said cutting means to distribute said material upon said cutting means and substantially to prevent said material from by-passing said cutting means.

7. A machine of the character described comprising a base, a housing adapted to be secured to said base, said housing having a material inlet and a material outlet in communication with each other, material feeding means adjustably mounted on said housing in communication with said inlet, a support mounted on said base, a plurality of spaced rotary cutting means rotatably mounted in said support, driving means operatively connected with said cutting means, said driving means being adapted to drive one of said cutting means in a direction opposite to that of another, and means adapted to cooperate with said cutting means to discharge from said machine material cut therein.

8. A machine of the character described comprising a base, a housing adapted to be secured to said base, said housing having a material inlet and a material outlet in communication with each other, a support mounted on said base, a plurality of spaced rotary cutting means rotatably mounted in said support, driving means operatively connected with said cutting means, said driving means being adapted to drive one of said cutting means in a direction opposite to that of another, means in communication with said outlet for discharging from said outlet material cut in said machine, and a material receptacle adjustably connected with said base in communication with said outlet.

9. A machine of the character described comprising a base, a housing adapted to be secured to said base, said housing having a material inlet and a material outlet in communication with each other, material feeding means adjustably mounted on said housing in communication with said inlet, a support mounted on said base, a plurality of spaced rotary cutting means rotatably mounted in said support, driving means operatively connected with said cutting means, said driving means being adapted to drive one of said cutting means in a direction opposite to that of another, means in communication with said outlet for discharging from said outlet material cut in said machine, and a material receptacle adjustably connected with said base in communication with said outlet.

10. A machine of the character described comprising a base, a housing adapted to be secured to said base, said housing having a material inlet and a material outlet in communication with each other, a support mounted on said base, motive means adjustably mounted on said support, a plurality of cooperating rotary cutting means rotatably mounted in said support, driving means mounted in said support and operatively connected with said motive means and said cutting means, said driving means being adapted to drive one of said cutting means in a direction opposite to that of another, guide means detachably mounted on said support in communication with said inlet and adapted to direct material introduced through said inlet to said cutting means, and means in communication with said guide means and said outlet for discharging from said machine material cut therein.

11. In a machine of the character described having a base, a support mounted on said base, cutting means rotatably mounted on said support, said cutting means comprising a plurality of knife shafts, each of said knife shafts having an axially extending bore, and motive means adjustably mounted on said support and operatively connected with said cutting means, means connecting said cutting means and said motive means comprising a collar secured to each of said knife shafts at its bored end, said collar having on its outer face a plurality of radially spaced holes, and driving means operatively connected with said motive means, said driving means comprising a plurality of spaced knife-driving shafts rotatably mounted in said support, said knife-driving shafts respectively being in axial alignment with said knife shafts, each of said knife-driving shafts having secured at one of its ends an axially extending connecting pin and a collar having a radially spaced driving pin, said pins being adapted to engage the bore of said knife shafts and the holes of said first mentioned collar, respectively.

ARTHUR H. AHRNDT.